United States Patent
Van Dijk

(10) Patent No.: US 8,091,288 B2
(45) Date of Patent: Jan. 10, 2012

(54) GREENHOUSE CONSTRUCTION WITH RAIL SYSTEM

(75) Inventor: Jacobus Johannes Wilhelmus Van Dijk, Pijnacker (NL)

(73) Assignee: Klimrek I.E. B.V., Pijnacker (NL)

( * ) Notice: Subject to any disclaimer, the term of this patent is extended or adjusted under 35 U.S.C. 154(b) by 0 days.

(21) Appl. No.: 10/576,979

(22) PCT Filed: Oct. 25, 2004

(86) PCT No.: PCT/NL2004/000749
§ 371 (c)(1),
(2), (4) Date: Feb. 2, 2007

(87) PCT Pub. No.: WO2005/039272
PCT Pub. Date: May 6, 2005

(65) Prior Publication Data
US 2007/0193111 A1    Aug. 23, 2007

(30) Foreign Application Priority Data
Oct. 24, 2003 (NL) ...................................... 1024621

(51) Int. Cl.
*E04B 7/12* (2006.01)
(52) U.S. Cl. ............................ 52/18; 47/17; 52/DIG. 17
(58) Field of Classification Search ............. 47/17, 19.1; 52/13, 6, 18, DIG. 17; D25/15
See application file for complete search history.

(56) References Cited

U.S. PATENT DOCUMENTS

| | | | | |
|---|---|---|---|---|
| 4,077,158 A * | 3/1978 | England | ....................... | 47/59 R |
| 5,438,794 A * | 8/1995 | Wi | ..................... | 47/17 |
| 5,655,335 A * | 8/1997 | Vermeer | .......................... | 52/66 |
| 5,915,132 A * | 6/1999 | Counts, Jr. | ......................... | 396/1 |
| 6,098,335 A * | 8/2000 | Brown, Jr. | ........................ | 47/17 |
| 2003/0097786 A1 * | 5/2003 | Van Horssen et al. | ............ | 47/17 |

FOREIGN PATENT DOCUMENTS

| | | |
|---|---|---|
| DE | 36 34 805 A | 4/1988 |
| GB | 2 341 833 A | 3/2000 |
| NL | 1 005 626 C | 6/1998 |

OTHER PUBLICATIONS

Patent Abstracts of Japan, vol. 2000, No. 02, Feb. 29, 2000 & JP 11 299364 A (Topy Green KK), (Not Attached).
JP 11 299364 A (Topy Green KK), Nov. 2, 1999 Abstract; Figues. (Not Attached).

* cited by examiner

Primary Examiner — Eileen D Lillis
Assistant Examiner — Branon Painter
(74) Attorney, Agent, or Firm — Young & Thompson

(57) ABSTRACT

Greenhouse construction consisting of a number of rooves with supporting members, such as longitudinal beams, ridges and gutters. These supporting members are provided with rails for moving a carriage or the like over them. The rails and supporting members provide each other with structural strength so that a relatively slim construction with no or hardly any restriction in the light level in the greenhouse construction occurs.

10 Claims, 3 Drawing Sheets

GREENHOUSE CONSTRUCTION WITH RAIL SYSTEM

This application is a national stage filing under 35 U.S.C. 371 of International Application PCT/NL2004/000749, filed on Oct. 25, 2004, which claims priority from Dutch Application No: 1024621, filed on Oct. 24, 2003. The entire teachings of the referenced Application is incorporated herein by reference. International Application PCT/NL2004/000749 was published under PCT Article 21(2) in English.

The present invention relates to a greenhouse construction with rail system for moving a carriage thereover for moving plants and/or carrying out further treatments thereon, said greenhouse construction comprising vertical boundary walls as well as columns and horizontal support members spaced from the floor. Here support members are understood to be truss-beams, gutters, girders or ridges. Truss-beam constructions are known that are integrated in the gutters, but in general a truss-beam will comprise longitudinal beams joined to the columns, where roof constructions bear on said columns or longitudinal beams, where each roof construction borders on the next roof construction along a boundary line, which boundary line is perpendicular to said longitudinal beams.

Such a construction is generally known in the state of the art. With this arrangement the longitudinal beams or truss-beams are used to give cohesion to the greenhouse construction and can support the roof or the cover depending on the construction. Central heating systems are installed in such greenhouse constructions and parts thereof are used to support carriages. Special constructions are used when supporting carriages of greater weight, such as can be used for picking up, transferring and setting down plants. Such carriages move in the direction parallel to the boundary between two rooves, that is to say parallel to the gutter construction that is usually present in this location. The crop is cultivated in a corresponding manner.

Although such a construction is found to be extremely fit for purpose it is expensive because special measures have to be taken to support such carriages.

The aim of the present invention is to remove this disadvantage and to provide a simple transport system that is inexpensive to implement in a greenhouse construction.

This aim is realised with a greenhouse construction as described above in that said rail system is fixed to said support members and imparts structural strength to said support members and/or forms part thereof, and in that said rail system extends continuously over a distance of at least three successive columns. According to the present invention the rail system is now constructed as a structural unit with the support member concerned. That is to say, according to the present invention structural components of the greenhouse construction are used for moving carriages along them. In particular, the longitudinal beams, gutters, girders or ridges which are present in a greenhouse construction to achieve cohesion are used for moving carriages and the like along them. Such longitudinal beams and other support members are appreciably oversized. After all, these must be capable of preventing damage to the greenhouse even when subjected to high winds/snow loads and the like. This means that under circumstances where the loading is relatively limited there is appreciable overcapacity in the construction. The present invention makes effective use of this overcapacity, as a result of which it is no longer necessary to install separate suspension constructions for moving heavy carriages in greenhouses. On the other hand, the above insight can be taken into account in the case of new constructions to be designed. That is to say, as a result of the presence of a rail system that also contributes to the structural strength the support member concerned can be made more lightweight as such. This always means that the complete construction including rail is lighter, as a result of which the cost price is lower and the amount of light in the greenhouse is increased. The rail system according to the invention extends continuously, that is to say does not terminate at vertical columns.

The carriages described above can be used for a wide variety of applications. Examples are the picking up, storage and transfer of plants described above. It is also possible to mount robots thereon to perform automatic treatment. Another example is the installation of movable lighting. Moreover, further equipment can be connected to such a carriage in order to carry out treatments on the crop. The carriage is only temporarily located above the crop, so that the presence thereof does not have an adverse effect on the productivity.

It is also possible to use the carriage concerned as a building platform or support for an air blower, spray equipment and vision equipment.

Another example is a (light) partition. Such a partition can be positioned either horizontally or vertically. When a partition is used there can be a winding construction for winding up/unwinding the blind. Furthermore, there can be a storage greenhouse, for example on the side wall of the greenhouse. With this construction the light loss is appreciably restricted. Because there are no special support constructions for the carriage the light level in the greenhouse will be increased.

The consequence of the present invention is that if the support members comprise a longitudinal beam or truss-beam the direction of movement of the carriage is parallel to the longitudinal beams that support the roof construction, that is to say is essentially perpendicular to the boundary between two rooves, that is to say perpendicular to the gutter that is generally installed between them at this location. More particularly, if it is fixed to or forms part of the longitudinal beam in a greenhouse construction consisting of rooves, the rail system extends over more than one, and in particular more than five, such rooves. That is to say the rail system is a continuous system that is not interrupted by the rooves of the greenhouse construction. With this arrangement measures of course have to be taken to make it possible for the rail system and a vertical column to cross. In this context the rail system can be installed in a position on the outside of such a vertical column. It is also possible to make cut-outs in the vertical column at the location of the rail system, fixed to the longitudinal beam, for passage of the rail system or constructions fixed thereto.

It will be understood that the rail system according to the present invention is in the greenhouse, that is to say on the inside of the panels that provide separation between the greenhouse and the surroundings. As a result of the particular method of installation of the rail system the cultivation direction in a greenhouse can be matched to this. This applies in particular if there are different crops or crops in different stages of growth in a greenhouse.

Moreover, at the "end" of each rail system there are preferably means for moving a carriage to a subsequent section, that is to say to a subsequent rail system that is delimited between two adjacent beams. In this way a larger greenhouse surface area can be covered with a single carriage.

Because the carriage now extends perpendicularly to the direction of the gutter it is no longer necessary to compensate for differences in height in the case of longer greenhouse constructions. After all, in the case of longer greenhouses (tens to hundreds of metres) the fall of the gutter will mean that there are substantial changes in height in the guttering direction. Because the carriage according to the present invention moves perpendicularly to the guttering direction, such changes in height do not occur. Such a change in height is necessary only in the case of the movement, described above, of a carriage from one rail system to a subsequent rail system.

If the longitudinal beams consist, for example, of beams with two or three longitudinal sections and link sections arranged between them, a rail of the rail system can be fixed to one of said longitudinal sections. It is also possible to construct one of said longitudinal sections in such a way that this also functions as a rail. In all cases the rail can impart strength characteristics to the longitudinal beam. In this description a rail is understood to be any construction suitable for guiding wheels, rollers or runners of a carriage or the like. The term rail also covers a toothed belt, chain or the like. Here a carriage is understood to be a construction that moves along a rail system and by means of which the operations described above can be carried out. As a result of this construction of, in particular, the rail system in combination with the longitudinal beam, material is saved and light loss in the greenhouse is prevented as far as possible.

The roof construction can comprise any roof construction known in the art. These can be triangular, arc-shaped and the like. Moreover, it is possible to make the roof construction lightweight. In such a case it is no longer necessary to provide a column below the longitudinal beams underneath each end limit of a roof, that is to say the end limit (gutter) of two adjacent rooves rests on the longitudinal beam which at that location does not bear directly via a vertical column on the underlying base. Such lightweight constructions can be produced, inter alia, using plastic materials such as plastic panels or plastic film constructions that are spanned in some way or other.

If the carriage is provided with devices that operate electrically, there can be either an individual power supply or power can be taken from the surroundings. In the latter case there can be sliding contacts for this purpose. Moreover, the carriage described above can be provided with lifting and gripping means.

According to the present invention it is proposed additionally to use structural components of the greenhouse construction, which are necessary because of the strength thereof, for other purposes. Within the framework of this concept it is also possible to use parts of the roof construction for moving carriages or other components, such as movable lighting, along them. In particular, a ridge beam or one of the guttering sections that has a rail system can be used for this purpose.

The invention will be explained in more detail below with reference to an illustrative embodiment shown in the drawing. In the drawing.

Figure 1:
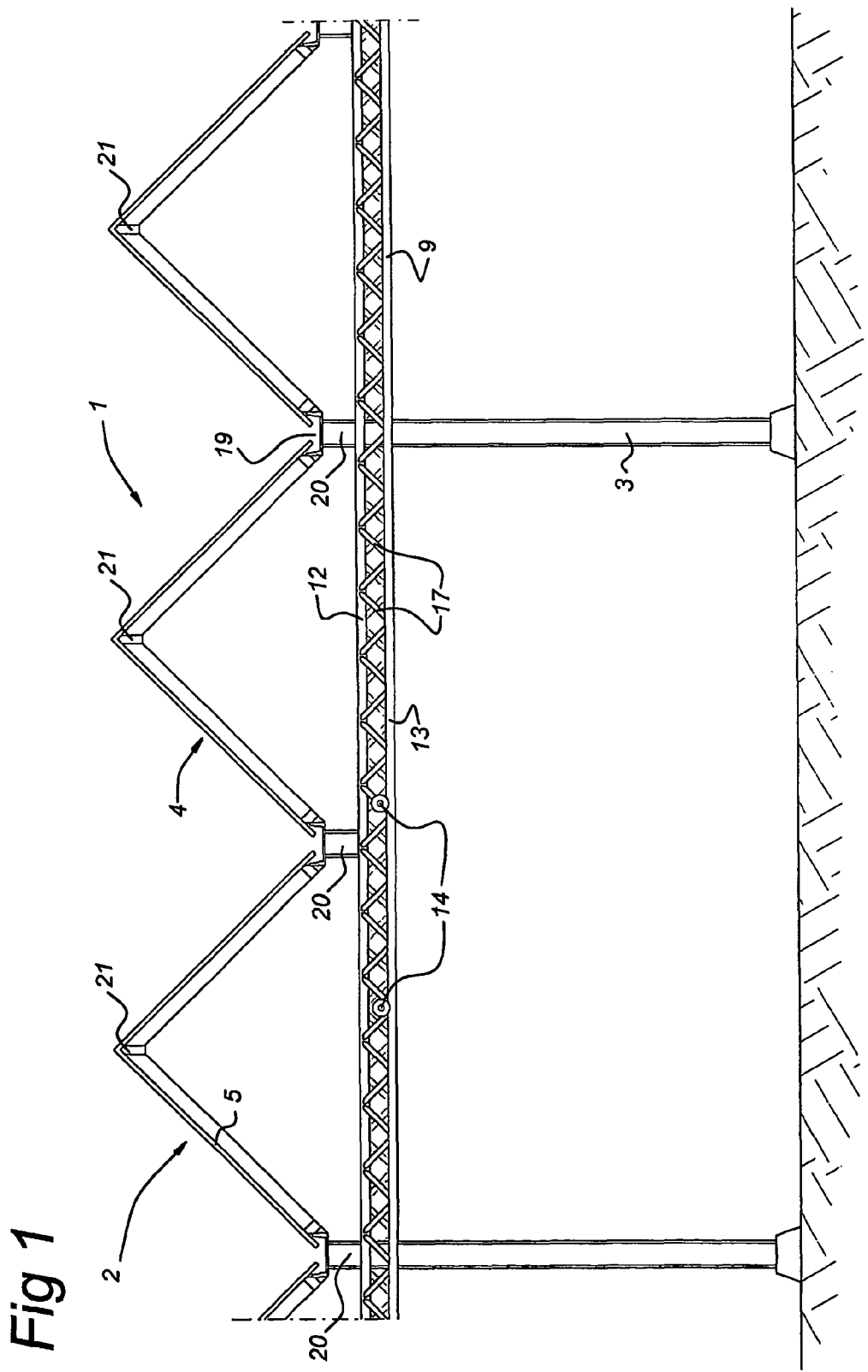
FIG. 1 shows a side view of the greenhouse construction according to the present invention.

A greenhouse construction is indicated in its entirety by 1 in FIG. 1. This consists of a roof construction 2 consisting of individual rooves 4 each made up of panels 5. The roof constructions bear on vertical columns 3 or auxiliary columns 20. There are longitudinal beams 9 to maintain the cohesion between the columns 3 and to support auxiliary columns 20, if necessary. The end wall of the greenhouse is not indicated. A gutter is indicated by 19 and a ridge section by 21.

Any roof construction known in the state of the art can be used for the roof construction. A relatively lightweight roof construction is shown in the figures. Therefore it is not necessary to support the boundary between the two rooves 4 shown, which is indicated by 19 (gutter), with a column 3. Column 3 is installed only at a subsequent boundary. It will be understood that the column 3 can be installed in any other position depending on the construction.

Auxiliary column 20 serves to support the gutter 19 at a location where there is no column 3. It will be understood that it is possible to position the longitudinal beam 9 higher, so that the gutters are supported directly.

Each roof construction has the gutter 19 described above.

The present invention relates in particular to greenhouse constructions with a roof construction that is closed. That is to say there are no windows that can be opened. The construction is made such that the climate is completely insulated from the surroundings. This can be achieved, for example, using a cooling installation as described in Netherlands patent 1 023 900 in the name of Klimrek I. E. B. V., Pijnacker.

Because with such a roof construction there are no longer any windows that have to open and close, a large number of bars and further constructions are dispensed with as a result. As a result it is possible to position other structural parts in the triangular space (or space of another shape). The panels 5 can be made up of film material.

Apart from the links described above it is also possible to install further constructions in the rooves. One example is movable lighting. Movable lighting is used to expose crops to varying levels of light. Such movable constructions are preferably fixed to the ridge section 21 or the gutters/guttering sections 19.

Figure 2:
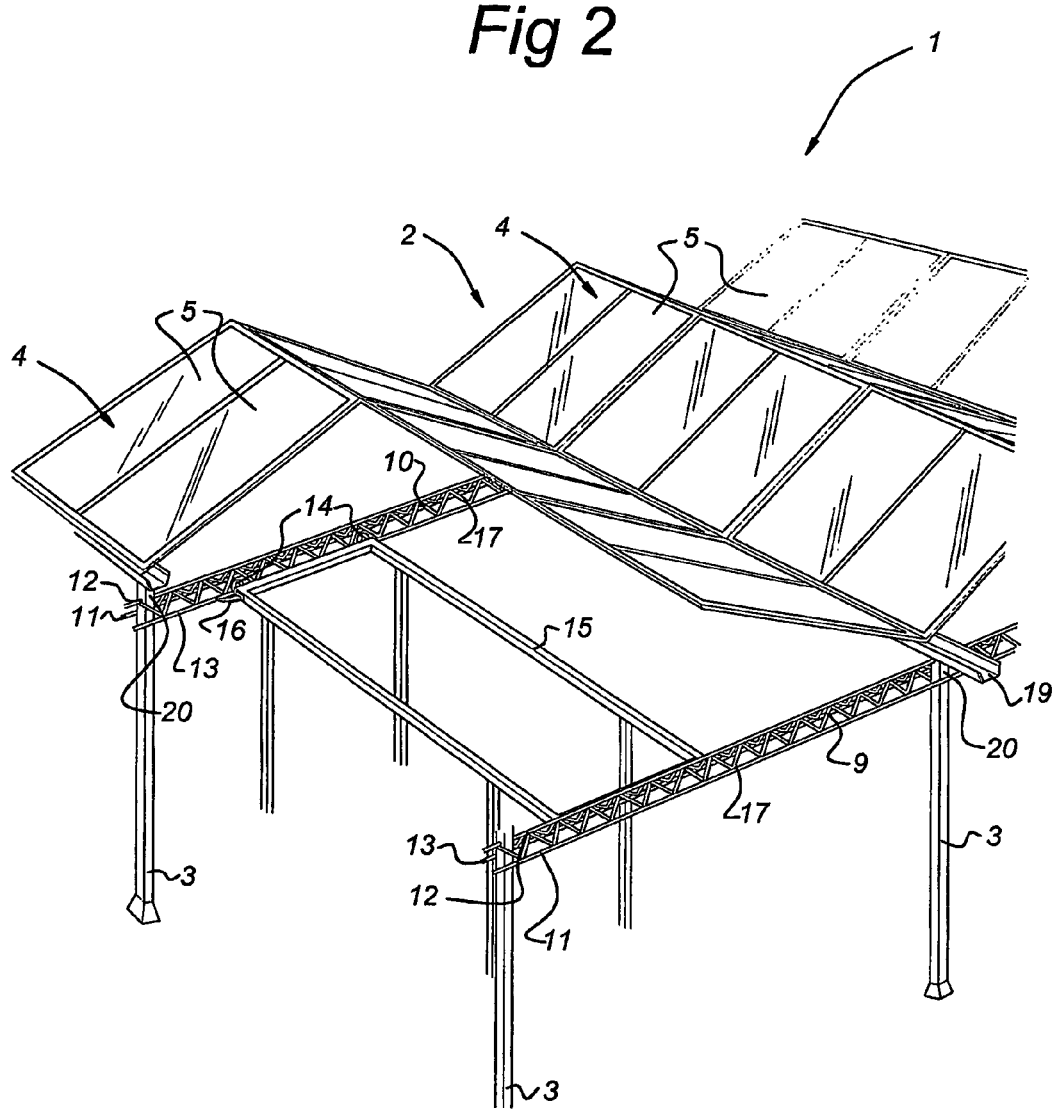
FIG. 2 shows the greenhouse construction according to FIG. 1, partially exposed and in perspective.

A detail of the construction shown in FIG. 1 can be seen in perspective view in FIG. 2. In this detail two longitudinal beams 9 and 10 are shown, between which roof constructions 2 extend in the manner shown in FIG. 1. Each longitudinal beam 9, 10 consists of three longitudinal sections 11, 12, 13. One of the longitudinal sections 13 is constructed such that it acts as a rail for taking wheels 14 of a carriage 15. There are link sections 17 to join the three longitudinal sections to one another.

It can be seen from the drawings that the direction of movement of the carriage 15 is perpendicular to the direction of boundary line 19 or gutter 19. With the present invention it is possible, without far-reaching structural measures, to provide a system for mounting a carriage or the like by means of which an appreciable weight can be moved.

In a manner that is not shown the rail 13 is interrupted, or can be interrupted, in some way or other at the end of the rail, such that the carriage 15 can be moved to an adjacent rail system, in FIG. 2, to the left or the right of the beams 9 or 10.

It will be understood that especially in the case of relatively lightweight roof constructions the distance between the beams can be large. A distance between the beams of 8-20 m is mentioned as an example. The carriage that moves between them will have to have a corresponding width. Section 13 can be either the bottom, top or side section of the longitudinal beams. A rail can be fixed thereto, but the section 13 can also, for example, have a U-shaped part for taking a wheel.

Using the construction described above it is possible to cultivate the crop in a conventional manner, that is to say in areas perpendicular to the direction of movement of the carriage 15. It is now also possible to position specific crops in the same stage of development in the direction of movement of the carriage 15.

In the first case, that is to say with the conventional method of cultivation, the present invention has the advantage that no contaminants can be moved between upstream and downstream parts of a crop area.

As indicated above it is also possible to install the rail system beneath the ridge or in/alongside a girder or gutter 19. With this arrangement use is made of the structural strength of the ridge, girder or gutter. As a result the component concerned can be made lighter in a new design. In the case of the existing construction it is not necessary to take special measures to provide adequate strength for mounting the rail system.

Figure 3:
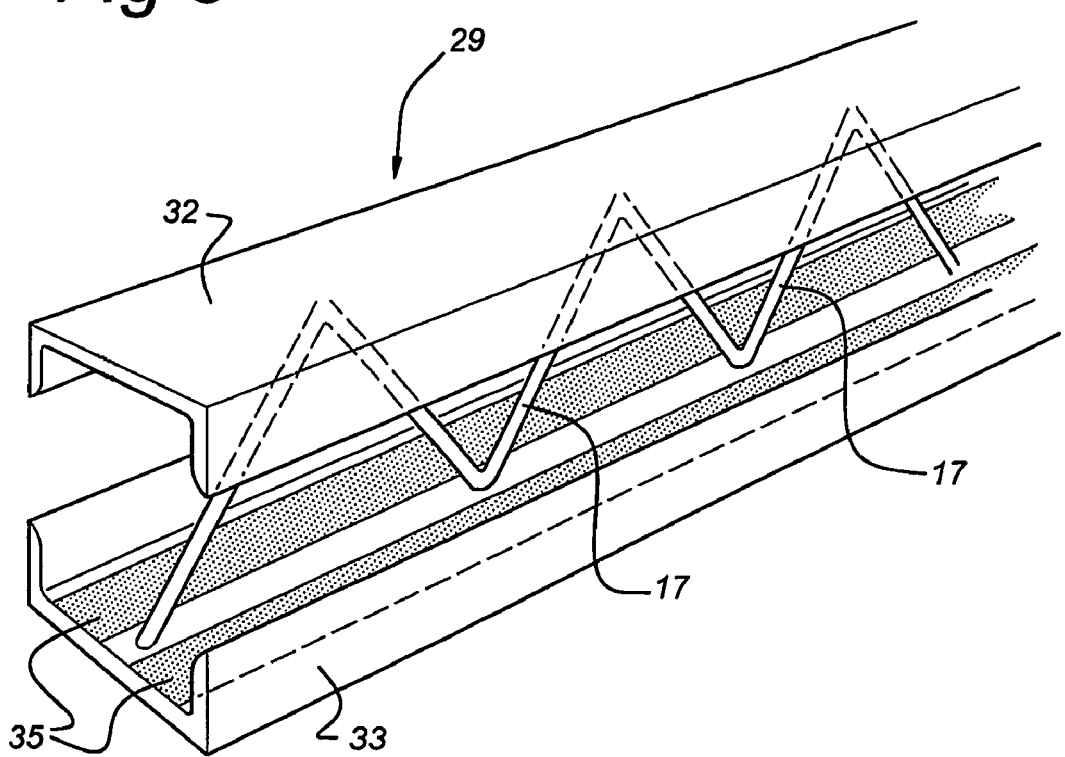
FIG. 3 is a variant of the longitudinal beams shown in FIGS. 1 and 2.

A variant of the beam 9 shown in FIG. 2 is shown in FIG. 3. This is indicated in its entirety by 29. This consists of two sections 32 and 33, which are located one above the other and are of U-shaped construction. There are link sections 17 that are always welded in the centre of the U-section 32, 33 concerned. Because the link sections 17 have a smaller diameter than the width of the "tray" delimited by the section 33, a wheel or other construction of a carriage can be moved in the remaining part that is indicated by 35. Although the invention is described above with reference to a preferred embodiment, variants which fall within the scope of the appended claims will be immediately apparent to those skilled in the art.

The invention claimed is:

1. A greenhouse construction with rail system for moving a carriage thereover for moving plants or carrying out further treatments thereon, said greenhouse construction comprising:
    a movable carriage (15) comprising wheels (14);
    a roof construction (2) comprised of plural connected individual roofs (4);
    plural vertical columns (3);
    first and second longitudinal beams (9, 10) extending, in a first direction, between and connected to said columns (3), the first and second longitudinal beams (9, 10) maintaining cohesion between said vertical columns (3),
    said first and second longitudinal beams comprising an integrated rail system for supporting the movable carriage,
    the integrated rail system contributing structural strength, as part of the first and second longitudinal beams, supporting the roof construction,
    the first and second longitudinal beams, including the integrated rail system, extending continuously over a distance of at least three successive columns;
    plural gutters (19) running in a second direction, between and over the first longitudinal beam (9) and the second longitudinal beam (10);
    each individual roof (4) comprising one of the gutters (19) and extending, in the second direction, between and over the first longitudinal beam (9) and the second longitudinal beam (10);
    plural ridge sections (21), each ridge section (21) connecting two of said individual roofs (4) along edges of the individual roofs, the ridge sections (21) extending in the second direction,
    each individual roof (4) comprised of plural panels (5), each panel extending from a corresponding one of the gutters (19) to a corresponding one of the ridge sections (21), the panels (5) connected to each other from the first longitudinal beam (9) to the second longitudinal beam (10); and
    the movable carriage (15) supported by each of the first and second longitudinal beams (9, 10) and fully extending between the first and second longitudinal beams (9, 10), the carriage movable in the first direction, wherein,
    each of the first and second longitudinal beams (9, 10) comprises two longitudinal sections (32, 33) extending in the first direction with an upper, first of the longitudinal sections (32) located above a lower, second of the longitudinal sections (33),
    the two longitudinal sections are joined, along a centerline of each longitudinal section, by link sections (17), and
    the lower, second of the longitudinal sections (32) comprises a support part (35) extending in the first direction, the support part (35) taking the wheels (14) of the carriage (15), the integrated rail system comprising the support part (35) taking the wheels (14) of the carriage (15).

2. The greenhouse construction of claim 1, further comprising:
    plural auxiliary columns (20) respectively supported by said vertical columns (3); and
    further auxiliary columns (20) supported by said longitudinal beams (9, 10), each of the further auxiliary columns (20) being located intermediate two adjacent vertical columns (3) of a corresponding one of the first and second longitudinal beams (9, 10), said further auxiliary columns (20) not being directly above any of said vertical columns (3), at least some of the gutters (19) supported by the further auxiliary columns (20).

3. The greenhouse construction of claim 1, wherein,
    the two longitudinal sections each have a U cross-section with open parts of each U cross-section facing each other, and
    the support part (35) comprises by an area extending in the first direction and defining a tray (35), the tray (35) taking the wheels (14) of the carriage (15), the integrated rail system comprising the tray (35) taking the wheels (14) of the carriage (15).

4. The greenhouse construction of claim 1, wherein,
    the support part (35) comprises by an area extending in the first direction and defining a tray (35), the tray (35) taking the wheels (14) of the carriage (15), the integrated rail system comprising the tray (35) taking the wheels (14) of the carriage (15).

5. The greenhouse construction of claim 1, wherein, the panels (5) are made of a film material.

6. A greenhouse construction with rail system for moving a carriage thereover for moving plants or carrying out further treatments thereon, said greenhouse construction comprising:
    a movable carriage (15) comprising wheels (14);
    a roof construction (2) comprised of plural connected individual roofs (4);
    plural vertical columns (3);
    first and second longitudinal beams (9, 10) extending, in a first direction, between and connected to said columns (3), the first and second longitudinal beams (9, 10) maintaining cohesion between said vertical columns (3),
    said first and second longitudinal beams comprising an integrated rail system for supporting the movable carriage,
    the integrated rail system contributing structural strength, as part of the first and second longitudinal beams, supporting the roof construction,
    the first and second longitudinal beams, including the integrated rail system, extending continuously over a distance of at least three successive columns;
    plural gutters (19) running in a second direction, between and over the first longitudinal beam (9) and the second longitudinal beam (10);

each individual roof (4) comprising one of the gutters (19) and extending, in the second direction, between and over the first longitudinal beam (9) and the second longitudinal beam (10), adjacent ones of said individual roofs (4) being connected along edges of the individual roofs; and the movable carriage (15) supported by each of the first and second longitudinal beams (9, 10) and fully extending between the first and second longitudinal beams (9, 10), the carriage movable in the first direction, wherein, each of the first and second longitudinal beams (9, 10) comprises two longitudinal sections (32, 33) extending in the first direction with an upper, first of the longitudinal sections (32) located above a lower, second of the longitudinal sections (33), the two longitudinal sections are joined, along a centerline of each longitudinal section, by link sections (17), and the lower, second of the longitudinal sections (32) comprises a support part (35) extending in the first direction, the support part (35) taking the wheels (14) of the carriage (15), the integrated rail system comprising the support part (35) taking the wheels (14) of the carriage (15).

7. The greenhouse construction of claim 6, further comprising:

plural auxiliary columns (20) respectively supported by said vertical columns (3); and further auxiliary columns (20) supported by said longitudinal beams (9, 10), each of the further auxiliary columns (20) being located intermediate two adjacent vertical columns (3) of a corresponding one of the first and second longitudinal beams (9, 10), said further auxiliary columns (20) not being directly above any of said vertical columns (3), at least some of the gutters (19) supported by the further auxiliary columns (20).

8. The greenhouse construction of claim 6, wherein, the two longitudinal sections each have a U cross-section with open parts of each U cross-section facing each other, and the support part (35) comprises by an area defining a tray (35) extending in the first direction, the tray (35) taking the wheels (14) of the carriage (15), the integrated rail system comprising the tray (35) taking the wheels (14) of the carriage (15).

9. The greenhouse construction of claim 6, wherein, the support part (35) comprises by an area defining a tray (35) extending in the first direction, the tray (35) taking the wheels (14) of the carriage (15), the integrated rail system comprising the tray (35) taking the wheels (14) of the carriage (15).

10. The greenhouse construction of claim 6, wherein, the panels (5) are made of a film material.

* * * * *